United States Patent [19]

Miyamoto et al.

[11] Patent Number: 6,120,702

[45] Date of Patent: Sep. 19, 2000

[54] ALIGNING AGENT FOR LIQUID-CRYSTAL CELLS

[75] Inventors: Yoshio Miyamoto; Syunichi Sano; Makoto Mishina; Hiroyoshi Fukuro, all of Funabashi, Japan

[73] Assignee: Nissan Chemical Industries, Ltd., Tokyo, Japan

[21] Appl. No.: 09/147,498

[22] PCT Filed: Jul. 10, 1997

[86] PCT No.: PCT/JP97/02397

§ 371 Date: Jan. 11, 1999

§ 102(e) Date: Jan. 11, 1999

[87] PCT Pub. No.: WO98/02776

PCT Pub. Date: Jan. 22, 1998

[30] Foreign Application Priority Data

Jul. 11, 1996 [JP] Japan ..................... 8-181829

[51] Int. Cl.$^7$ ............. C09K 19/56; C08G 69/26; C08G 73/10

[52] U.S. Cl. ............. 252/299.4; 428/1.25; 428/1.26; 528/353

[58] Field of Search ............. 252/299.4; 428/1.25, 428/1.26; 349/134, 135; 528/353; 525/435

[56] References Cited

U.S. PATENT DOCUMENTS

| | | | |
|---|---|---|---|
| 5,607,732 | 3/1997 | Miyamoto et al. | 528/353 |
| 5,608,033 | 3/1997 | Nihira et al. | 528/353 |
| 5,665,856 | 9/1997 | Nihira et al. | 528/353 |
| 5,861,534 | 1/1999 | Nihira et al. | 564/305 |

FOREIGN PATENT DOCUMENTS

| | | |
|---|---|---|
| 0 772 074 | 5/1997 | European Pat. Off. . |
| 63-78130 | 4/1988 | Japan . |
| 3-214122 | 9/1991 | Japan . |
| 6-194670 | 7/1994 | Japan . |
| 8-114808 | 5/1996 | Japan . |
| 9-265098 | 10/1997 | Japan . |

OTHER PUBLICATIONS

Patent Abstracts of Japan, vol. 16, No. 180 (C–0935), Apr. 30. 1992, JP 04 023832, Jan. 28, 1992.

*Primary Examiner*—Shean C. Wu
*Attorney, Agent, or Firm*—Oblon, Spivak, McClelland, Maier & Neustadt, P.C.

[57] ABSTRACT

An alignment treating agent for a liquid crystal cell, which is composed mainly of a polyimide and/or a polyimide precursor made by a reaction for polymerization of a tetra-carboxylic acid derivative component with a diamine component, wherein at least one part of the diamine component is a diamine component of the following formula (1):

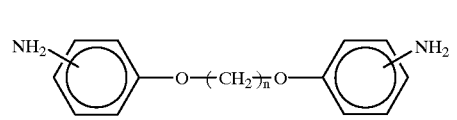

(1)

wherein n is an integer of from 1 to 12, and which gives a tilt angle of at most 2° to nematic liquid crystal.

5 Claims, No Drawings

ALIGNING AGENT FOR LIQUID-CRYSTAL CELLS

This application is a 371 of PCT/SP97/02397, filed Jul. 10, 1997.

TECHNICAL FIELD

The present invention relates to an alignment treating agent for a liquid crystal cell. More particularly, it relates to an alignment treating agent for a liquid crystal cell wherein nematic liquid crystal molecules have a low tilt angle to a substrate, an excellent alignment stability can be obtained with no change in the tilt angle during heat treatment after injection of liquid crystal, and an excellent uniformity in alignment of ferroelectric liquid crystal or antiferroelectric liquid crystal can be obtained.

BACKGROUND ART

A liquid crystal display device is a display device utilizing electro-optic changes of liquid crystal. Attention has been drawn to its characteristic such as small lightweight of the device or small consumption of electric power, and it has been developed significantly as a display device for various kinds of displays. Among these, a field effect type liquid crystal display device of twisted nematic type (TN type) is a typical example, wherein nematic liquid crystal having positive dielectric anisotropy is used, liquid crystal molecules are aligned in parallel to a substrate at the interface of each of a pair of electrode substrates facing each other, and the substrates are arranged so that the alignment directions of liquid crystal molecules are perpendicular to each other.

With regard to such a liquid crystal display device of TN type, it is important to align liquid crystal molecules so that the major axis direction of liquid crystal molecules is uniformly parallel to the substrate surface, and further liquid crystal molecules have a certain tilt angle to the substrate.

As typical methods to align liquid crystal molecules, two methods have been known. One method is to form an inorganic film on a substrate by vapor-depositing an inorganic substance such as silicon dioxide obliquely to the substrate, and to align liquid crystal molecule in the direction of vapor deposition. By this method, a stable alignment having a certain tilt angle can be obtained, but it is not industrially effective. The other method is to form an organic coating film on a substrate surface, to rub the surface with a cloth such as cotton, nylon or polyester in a predetermined direction, and to align liquid crystal molecules in the rubbing direction. By this method, stable alignment can be obtained relatively easily, and thus this method is mainly employed industrially. As the organic film, a polyvinyl alcohol, a polyoxyethylene, a polyamide or a polyimide may, for example, be mentioned. However, in view of chemical stability and thermal stability, a polyimide is most commonly used. A typical example of the polyimide used for a liquid crystal alignment film is disclosed in JP-A-61-47932.

On the other hand, with regard to a ferroelectric liquid crystal display device or an antiferroelectric liquid crystal display device, wherein ferroelectric liquid crystal or antiferroelectric liquid crystal having chiral smectic phase is used, and liquid crystal molecules are aligned at the interface of each of a pair of electrode substrates facing each other so that the layer direction is oriented in one direction to the substrate, it has been known to have more excellent high speed response and high angle of visibility as compared with a nematic liquid crystal display device, due to direct interaction between the field and a spontaneous polarization of liquid crystal molecules. Further, with regard to a surface-stabilized ferroelectric liquid crystal device or a surface-stabilized antiferroelectric liquid crystal device wherein the cell gap is made thinner than a helical pitch of ferroelectric liquid crystal or antiferroelectric liquid crystal, it has been known that a display device having bi-stability or tri-stability which can not be attained in a nematic liquid crystal display device and being highly precise even in a simple matrix electrode structure, can be prepared.

It is particularly important to align liquid crystal molecules uniformly in a predetermined direction in the ferroelectric liquid crystal device or the antiferroelectric liquid crystal device. As a typical method to align liquid crystal in such a manner, like in the case of the nematic liquid crystal display device, a method to form an inorganic film on a substrate by vapor-depositing an inorganic substance such as silicon dioxide obliquely, or a method to form an inductive coating film on a substrate surface and to rub the surface with a cloth in a predetermined direction, has been known. As the organic film to be rubbed, a polyimide is usually used, in view of chemical stability and thermal stability, like in the case of the nematic liquid crystal display device. However, with the conventional polyimide, the alignment of ferroelectric liquid crystal or antiferroelectric liquid crystal was not necessarily satisfactory. Further, even if an excellent alignment could be obtained, there were problems in the synthesis of the polyimide, such being problematic for the practical use.

With regard to the field effect type liquid crystal display device of TN type wherein nematic liquid crystal having positive dielectric anisotropy is used, liquid crystal molecules are aligned in parallel to a substrate at the interface of each of a pair of electrode substrates facing each other, and the substrates are arranged so that the alignment directions of liquid crystal molecules are perpendicular to each other, it is important to align liquid crystal molecules on the substrate surface, so that the major axis direction of liquid crystal molecules is uniformly parallel, and further, liquid crystal molecules have a certain tilt angle to the substrate. Particularly, in recent years, it is required to constantly obtain a low tilt angle of at most 2°, in order to improve the contrast of the field effect type liquid crystal display device of TN type.

However, with regard to a liquid crystal alignment film comprising a conventional polyimide, even if a low tilt angle was obtained after injection of liquid crystal, such a tilt angle sometimes changed when it was heated at a temperature higher than the isotropic temperature of liquid crystal (hereinafter referred to as isotropic treatment). Further, there was a problem that the tilt angle was likely to decrease and alignment of liquid crystal molecules was in disorder by isotropic treatment. Such a problem must be solved in order to obtain more uniform liquid crystal display having higher contrast for liquid crystal display devices, and a polyimide alignment film which gives a low tilt angle of at most 2° constantly against heat treatment, has been desired.

On the other hand, with regard to a ferroelectric liquid crystal device or an antiferroelectric liquid crystal device, it is very important to obtain an uniform initial alignment of liquid crystal, and it has been known that the alignment condition significantly affects performance of a liquid crystal device. However, it is difficult to control the alignment condition of ferroelectric liquid crystal or antiferroelectric liquid crystal uniformly. Defects in alignment such as zigzag defects are usually observed on the rubbed polyimide film, and they cause a significant decrease in performance of the liquid crystal device such as a decrease in contrast, such being problematic. Further, as an alignment film having ferroelectric liquid crystal aligned well, an aliphatic diamine having an alkylene group in the main chain can be used, as disclosed in JP-A-8-248424. However, such an aliphatic diamine is poor in reactivity for polymerization, and there were problems in respect to obtaining a predetermined polyimide varnish.

It is an object of the present invention to provide an alignment treating agent for a liquid crystal cell using nematic liquid crystal, wherein a liquid crystal alignment film having a low tilt angle being stable against heat treatment, and an uniform liquid crystal display with high contrast can be obtained; and an alignment treating agent for a liquid crystal cell using ferroelectric liquid crystal or antiferroelectric liquid crystal, which controls the alignment condition of liquid crystal uniformly.

DISCLOSURE OF THE INVENTION

The present invention relates to an alignment treating agent for a liquid crystal cell. The present inventors have intensively studied in detail and systematically the alignment treating agent for a liquid crystal cell using nematic liquid crystal, which gives a low tilt angle being stable against heat treatment and as a result, have accomplished the present invention.

Namely, the present invention relates to an alignment treating agent for a liquid crystal cell, which is composed mainly of a polyimide and/or a polyimide precursor made by a reaction for polymerization of a tetracarboxylic acid derivative component with a diamine component, wherein at least one part of the diamine component is a diamine of the following formula (1):

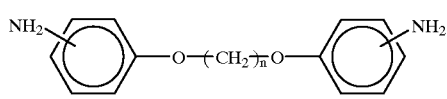

(1)

wherein n is an integer of from 1 to 12, and which gives a tilt angle of at most 2° to nematic liquid crystal.

BEST MODE FOR CARRYING OUT THE INVENTION

Now, the present invention will be described in further detail. The diamine of the formula (1) to be used in the present invention is synthesized usually as follows. An α,ω-dihalogenoalkane and nitrophenol are dissolved in acetonitrile at a molar ratio of 1:2, and the reaction mixture is refluxed at a temperature of 80° C. in the coexistence of potassium carbonate, to obtain a dinitro compound. The dinitro compound is reduced to obtain the diamine of the formula (1). As a method of reduction, catalytic hydrogenation using palladium-carbon (Pd/C) catalyst under room temperature may, for example, be mentioned.

The treating agent for liquid crystal alignment of the present invention comprises a polyimide and/or a polyimide precursor having a certain diamine structure. A resin solution having such a polyimide and/or a polyimide precursor dissolved in an organic polar solvent is coated on a substrate provided with transparent electrodes, followed by drying and baking to form a polyimide resin film, and the film surface is subjected to alignment treatment such as rubbing treatment to use it as a liquid crystal alignment film.

With regard to the treating agent for liquid crystal alignment of the present invention, nematic liquid crystal molecules have a low tilt angle to the substrate, and good alignment with no change in the tilt angle by heat treatment can be obtained. Further, when the treating agent for liquid crystal alignment having such a performance is used as an alignment treating agent for ferroelectric liquid crystal or antiferroelectric liquid crystal, good alignment can be obtained.

The tetracarboxylic dianhydride and its derivative to be used in the present invention may, for example, be an aromatic tetracarboxylic acid such as pyromellitic acid, benzophenone tetracarboxylic acid, biphenyl tetracarboxylic acid or naphthalene tetracarboxylic acid, its dianhydride or its dicarboxylic acid diacid halide; an alicyclic tetracarboxylic acid such as cyclobutane tetracarboxylic acid, cyclopentane tetracarboxylic acid, cyclohexane tetracarboxylic acid or 3,4-dicarboxy-1,2,3,4-tetrahydro-1-naphthalene succinic acid, its dianhydride or its dicarboxylic acid diacid halide; an aliphatic tetracarboxylic acid such as butane tetracarboxylic acid, its dianhydride or its dicarboxylic acid diacid halide. Among these, an aromatic tetracarboxylic acid such as pyromellitic acid or cyclobutane tetracarboxylic acid is particularly preferred, in order to obtain an adequate effect of the present invention.

Such tetracarboxylic acids or their derivatives may be used alone or in combination as a mixture of two or more of them.

As the diamine component of the formula (1)

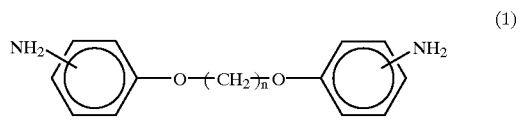

(1)

wherein n is an integer of from 1 to 12, a bis(4-aminophenoxy)alkane of the formula (2)

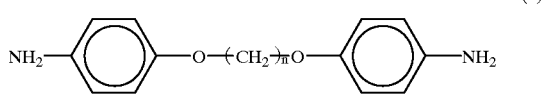

(2)

wherein n is an integer of from 1 to 12, is practically preferred.

n in the formula (1) and the formula (2) is usually from 1 to 12, preferably from 1 to 10, more preferably from 1 to 8, since heat resistance of the obtained polyimide tends to decrease if n becomes bigger.

Specific examples of the formula (2) include bis(4-aminophenoxy)methane, 1,2-bis(4-aminophenoxy)ethane, 1,3-bis(4-aminophenoxy)propane, 1,4-bis(4-aminophenoxy)butane, 1,5-bis(4-aminophenoxy)pentane, 1,6-bis(4-aminophenoxy)hexane, 1,7-bis(4-aminophenoxy) heptane, 1,8-bis(4-aminophenoxy)octane, 1,9-bis(4-aminophenoxy)nonane and 1,10-bis(4-aminophenoxy) decane.

Particularly, 1,3-bis(4-aminophenoxy)propane, 1,4-bis(4-aminophenoxy)butane, 1,5-bis(4-aminophenoxy)pentane, 1,6-bis(4-aminophenoxy)hexane, 1,7-bis(4-aminophenoxy) heptane, and 1,8-bis(4-aminophenoxy)octane are preferred.

The amount of the diamine component of the formula (1) to the total diamine component is not particularly limited, so long as a low tilt angle of at most 2° of nematic liquid crystal can be obtained. However, it is usually from 50 to 100 mol %, preferably from 70 to 100 mol %, particularly preferably from 85 to 100 mol %.

As examples of diamines other than the diamine component of the formula (1) of the present invention, specific examples may be mentioned which include aromatic diamines such as 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenyl ether, 2,2'-diaminodiphenylpropane, bis(3,5-diethyl4-aminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy) diphenylsulfone and 2,2-bis[4-(4-aminophenoxy)phenyl] propane, alicyclic diamines such as bis(4-aminocyclohexyl) methane and bis(4-amino-3-methylcyclohexyl)methane, and diaminocyclohexanes such as

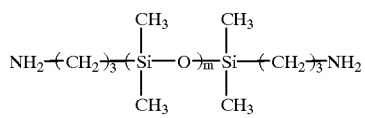

wherein m is an integer of from 1 to 10.

These diamines may be used alone or in combination as a mixture of two or more of them.

A tetracarboxylic dianhydride and a diamine are reacted and polymerized to obtain a polyimide precursor. As the tetracarboxylic acid derivative to be used, a tetracarboxylic dianhydride is usually used. The molar ratio of the tetracarboxylic dianhydride to the diamine is preferably from 0.8 to 1.2. Like in the normal condensation polymerization, the closer to 1 the molar ratio, the higher the polymerization degree of the polymer produced.

If the polymerization degree is too small, the strength of the polyimide coating film is inadequate, and if the polymerization degree is too high, work efficiency during forming of the polyimide coating film is likely to deteriorate. Accordingly, the polymerization degree of the reaction product of the present invention calculated as a reduced viscosity of a polyimide precursor solution, is preferably from 0.05 to 5.0 dl/g (as measured in N-methylpyrrolidone at a temperature of 30° C. and at a concentration of 0.5 g/dl.

As a method of reacting and polymerizing a tetracarboxylic dianhydride with a primary diamine, a solution polymerization method is usually preferred. Specific examples of a solvent to be used for the solution polymerization method include N,N-dimethylformamide, N,N-dimethylacetamide, N-methyl-2-pyrrolidone, N-methylcaprolactam, dimethylsulfoxide, tetramethylurea, pyridine, dimethylsulfone, hexamethylphosphoramide and butyllactone. These may be used alone or in combination as a mixture. Further, a solvent which does not dissolve the polyimide resin precursor, may be added to the above solvent in an amount within such a range that an uniform solution can still be obtained. The reaction temperature can be selected optionally within a range of from –20° C. to 150° C., preferably from –5° C. to 100° C.

To convert the polyimide resin precursor to the polyimide resin, a method of heating for dehydration ring-closure is employed. The heating temperature for dehydration ring-closure can be selected optionally within a range of from 150° C. to 450° C., preferably from 170° C. to 350° C. The time required for the dehydration ring-closure is usually from 30 seconds to 10 hours, preferably from 5 minutes to 5 hours, although it varies depending upon the reaction temperature.

Further, in the case where the polyimide is a so-called soluble polyimide which is soluble in an organic solvent, a polyimide precursor obtained by reacting a tetracarboxylic dianhydride and a primary diamine can be imide-modified by using a known dehydration ring-closure catalyst in a solution.

The polyimide resin solution thus obtained may be used as it is, or may be used as dissolved again in a poor solvent such as methanol or ethanol.

The solvent is not particularly limited so long as it dissolves the obtained polyimide resin again. It may, for example, be 2-pyrrolidone, N-methylpyrrolidone, N-ethylpyrrolidone, N-vinylpyrrolidone, N,N-dimethylacetamide, N,N-dimethylformamide, γ-butyllactone or diglyme.

The polyimide and/or the polyimide precursor solution of the present invention obtained as mentioned above, is coated on a transparent substrate of e.g. glass or plastic provided with transparent electrodes by a method such as a spin coating or transfer printing method, followed by heat treatment under the above conditions to form a polyimide film. The thickness of the polyimide film is not particularly limited, but it is preferably from 100 Å to 3000 Å, to be used for a liquid crystal alignment film. Then, the resin film is subjected to an alignment treatment such as rubbing treatment to obtain a treating agent for liquid crystal alignment.

Now, the present invention will be described in further detail with reference to Examples. However, it should be understood that the present invention is by no means restricted to such specific Examples.

EXAMPLE 1

22.8 g (0.1 mol) of 1,4-bis(4-aminophenoxy)butane and 19.2 g (0.098 mol) of 1,2,3,4-cyclobutane tetracarboxylic dianhydride were reacted in 343.5 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.9 dl/g (as measured in NMP at a temperature of 30° C. and at a concentration of 0.5 g/dl), was obtained.

This solution was diluted with NMP to a total solid content of 4 wt %. Then, the solution was spin-coated at 3500 rpm on glass substrates and then subjected to heat treatment at 80° C. for 5 minutes and at 250° C. for one hour to form polyimide resin films having a thickness of 1000 Å.

The coating films were rubbed with a cloth and assembled with a spacer of 50 μm interposed therebetween so that the respective rubbing directions are opposingly in parallel with each other, and nematic liquid crystal (ZLI-2293, manufactured by Merck Co.) was injected into the space to obtain a liquid crystal cell.

The alignment condition of the liquid crystal cell was observed by a polarization microscope, and confirmed to be uniform with no defect. Further, with respect to the cell, the tilt angle of liquid crystal was measured by a crystal rotation method and found to be 1.0°. Thus, the tilt angle was low and stable.

Further, the liquid crystal cell was subjected to heat treatment in an oven at a temperature of 120° C. for one hour, and the alignment condition was observed by a polarization microscope, whereby an uniform alignment with no defect was confirmed. Further, with regard to the cell, the tilt angle of liquid crystal was measured by a crystal rotation method and found to be 1.0°. Thus, the tilt angle was low.

EXAMPLE 2

24.2 g (0.1 mol) of 1,5-bis(4-aminophenoxy)pentane and 19.2 g (0.098 mol) of 1,2,3,4-cyclobutane tetracarboxylic dianhydride were reacted in 343.5 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.8 dl/g (as measured in NMP at a temperature of 30° C. and at a concentration of 0.5 g/dl), was obtained.

This solution was diluted with NMP to a total solid content of 4 wt %. Then, the solution was spin-coated at 3500 rpm on glass substrates and then subjected to heat treatment at 80° C. for 5 minutes and at 250° C. for one hour to form polyimide resin films having a thickness of 1000 Å.

The coating films were rubbed with a cloth and assembled with a spacer of 50 µm interposed therebetween so that the respective rubbing directions are opposingly in parallel with each other, and nematic liquid crystal (ZLI-2293, manufactured by Merck Co.) was injected into the space to obtain a liquid crystal cell.

The alignment condition of the liquid crystal cell was observed by a polarization microscope, and confirmed to be uniform with no defect. Further, with respect to the cell, the tilt angle of liquid crystal was measured by a crystal rotation method and found to be 0.9°. Thus, the tilt angle was low.

Further, the liquid crystal cell was subjected to heat treatment in an oven at a temperature of 1200 for one hour, and the alignment condition was observed by a polarization microscope, whereby an uniform alignment with no defect was confirmed. Further, with regard to the cell, the tilt angle of liquid crystal was measured by a crystal rotation method and found to be 1.0°. Thus, the tilt angle was low and stable.

EXAMPLE 3

34.2 g (0.1 mol) of 1,9-bis(4-aminophenoxy)nonane and 19.2 g (0.098 mol) of 1,2,3,4-cyclobutane tetracarboxylic dianhydride were reacted in 302.6 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.75 dl/g (as measured in NMP at a temperature of 30° C. and at a concentration of 0.5 g/dl), was obtained.

This solution was diluted with NMP to a total solid content of 4 wt %. Then, the solution was spin-coated at 3000 rpm on glass substrates and then subjected to heat treatment at 80° C. for 5 minutes and at 250° C. for one hour to form polyimide resin films having a thickness of 1000 Å.

The coating films were rubbed with a cloth and assembled with a spacer of 50 µm interposed therebetween so that the respective rubbing directions are opposingly in parallel with each other, and nematic liquid crystal (ZLI-2293, manufactured by Merck Co.) was injected into the space to obtain a liquid crystal cell.

The alignment condition of the liquid crystal cell was observed by a polarization microscope, and confirmed to be uniform with no defect. Further, with respect to the cell, the tilt angle of liquid crystal was measured by a crystal rotation method and found to be 0.9°. Thus, the tilt angle was low.

Further, the liquid crystal cell was subjected to heat treatment in an oven at a temperature of 120° C. for one hour, and the alignment condition was observed by a polarization microscope, whereby an uniform alignment with no defect was confirmed. Further, with regard to the cell, the tilt angle of liquid crystal was measured by a crystal rotation method and found to be 0.9°. Thus, the tilt angle was low and stable.

EXAMPLE 4

38.4 g (0.1 mol) of 1,12-bis(4-aminophenoxy)dodecane and 19.2 g (0.098 mol) of 1,2,3,4-cyclobutane tetracarboxylic dianhydride were reacted in 326.4 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.70 dl/g (as measured in NMP at a temperature of 30° C. and at a concentration of 0.5 g/dl), was obtained.

This solution was diluted with NmP to a total solid content of 4 wt %. Then, the solution was spin-coated at 2800 rpm on glass substrates and then subjected to heat treatment at 80° C. for 5 minutes and at 250° C. for one hour to form polyimide resin films having a thickness of 1000 Å.

The coating films were rubbed with a cloth and assembled with a spacer of 50 µm interposed therebetween so that the respective rubbing directions are opposingly in parallel with each other, and nematic liquid crystal (ZLI-2293, manufactured by Merck Co.) was injected into the space to obtain a liquid crystal cell.

The alignment condition of the liquid crystal cell was observed by a polarization microscope, and confirmed to be uniform with no defect. Further, with respect to the cell, the tilt angle of liquid crystal was measured by a crystal rotation method and found to be 1.7°. Thus, the tilt angle was low.

Further, the liquid crystal cell was subjected to heat treatment in an oven at a temperature of 120° C. for one hour, and the alignment condition was observed by a polarization microscope, whereby an uniform alignment with no defect was confirmed. Further, with regard to the cell, the tilt angle of liquid crystal was measured by a crystal rotation method and found to be 1.7°. Thus, the tilt angle was low and stable.

EXAMPLE 5

12.1 g (0.05 mol) of 1,5-bis(4-aminophenoxy)pentane, 10.1 g (0.05 mol) of diaminodiphenyl ether and 19.2 g (0.098 mol) of 1,2,3,4-cyclobutane tetracarboxylic dianhydride were reacted in 234.6 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.86 dl/g (as measured in NMP at a temperature of 30° C. and at a concentration of 0.5 g/dl), was obtained.

This solution was diluted with NMP to a total solid content of 4 wt %. Then, the solution was spin-coated at 3500 rpm on glass substrates and then subjected to heat treatment at 80° C. for 5 minutes and at 250° C. for one hour to form polyimide resin films having a thickness of 1000 Å.

The coating films were rubbed with a cloth and assembled with a spacer of 50 µm interposed therebetween so that the respective rubbing directions are opposingly in parallel with each other, and nematic liquid crystal (ZLI-2293, manufactured by Merck Co.) was injected into the space to obtain a liquid crystal cell.

The alignment condition of the liquid crystal cell was observed by a polarization microscope, and confirmed to be uniform with no defect. Further, with respect to the cell, the tilt angle of liquid crystal was measured by a crystal rotation method and found to be 1.9°. Thus, the tilt angle was low.

Further, the liquid crystal cell was subjected to heat treatment in an oven at a temperature of 120° C. for one hour, and the alignment condition was observed by a polarization microscope, whereby an uniform alignment with no defect was confirmed. Further, with regard to the cell, the tilt angle of liquid crystal was measured by a crystal rotation method and found to be 1.9°. Thus, the tilt angle was low and stable.

EXAMPLE 6

19.4 g (0.08 mol) of 1,5-bis(4-aminophenoxy)pentane, 4 g (0.02 mol) of diaminodiphenyl ether and 19.2 g (0.098 mol) of 1,2,3,4-cyclobutane tetracarboxylic dianhydride were reacted in 241.4 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.86 dl/g (as measured in NMP at a temperature of 30° C. and at a concentration of 0.5 g/dl), was obtained.

This solution was diluted with NMP to a total solid content of 4 wt %. Then, the solution was spin-coated at 4000 rpm on glass substrates and then subjected to heat treatment at 80° C. for 5 minutes and at 250° C. for one hour to form polyimide resin films having a thickness of 1000 Å.

The coating films were rubbed with a cloth and assembled with a spacer of 50 μm interposed therebetween so that the respective rubbing directions are opposingly in parallel with each other, and nematic liquid crystal (ZLI-2293, manufactured by Merck Co.) was injected into the space to obtain a liquid crystal cell.

The alignment condition of the liquid crystal cell was observed by a polarization microscope, and confirmed to be uniform with no defect. Further, with respect to the cell, the tilt angle of liquid crystal was measured by a crystal rotation method and found to be 1.7°. Thus, the tilt angle was low.

Further, the liquid crystal cell was subjected to heat treatment in an oven at a temperature of 120° C. for one hour, and the alignment condition was observed by a polarization microscope, whereby an uniform alignment with no defect was confirmed. Further, with regard to the cell, the tilt angle of liquid crystal was measured by a crystal rotation method and found to be 1.7°. Thus, the tilt angle was low and stable.

EXAMPLE 7

22.8 g (0.1 mol) of 1,4-bis(4-aminophenoxy)butane and 21.8 g (0.096 mol) of pyromellitic dianhydride were reacted in 252.7 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.92 dl/g (as measured in NMP at a temperature of 30° C. and at a concentration of 0.5 g/dl), was obtained.

This solution was diluted with NMP to a total solid content of 4 wt %. Then, the solution was spin-coated at 4000 rpm on glass substrates and then subjected to heat treatment at 80° C. for 5 minutes and at 250° C. for one hour to form polyimide resin films having a thickness of 1000 Å.

The coating films were rubbed with a cloth and assembled with a spacer of 50 μm interposed therebetween so that the respective rubbing directions are opposingly in parallel with each other, and nematic liquid crystal (ZLI-2293, manufactured by Merck Co.) was injected into the space to obtain a liquid crystal cell.

The alignment condition of the liquid crystal cell was observed by a polarization microscope, and confirmed to be uniform with no defect. Further, with respect to the cell, the tilt angle of liquid crystal was measured by a crystal rotation method and found to be 0.9°. Thus, the tilt angle was low.

Further, the liquid crystal cell was subjected to heat treatment in an oven at a temperature of 120° C. for one hour, and the alignment condition was observed by a polarization microscope, whereby an uniform alignment with no defect was confirmed. Further, with regard to the cell, the tilt angle of liquid crystal was measured by a crystal rotation method and found to be 0.9°. Thus, the tilt angle was low and stable.

EXAMPLE 8

31.4 g (0.1 mol) of 1,7-bis(4-aminophenoxy)heptane and 19.2 g (0.098 mol) of 1,2,3,4-cyclobutane tetracarboxylic dianhydride were reacted in 286.7 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.76 dl/g (as measured in NMP at a temperature of 30° C. and at a concentration of 0.5 g/dl), was obtained with good reproducibility.

This solution was diluted with NMP to a total solid content of 4 wt %. Then, the solution was spin-coated at 3000 rpm on glass substrates and then subjected to heat treatment at 80° C. for 5 minutes and at 250° C. for one hour to form polyimide resin films having a thickness of 1000 Å.

The coating films were rubbed with a cloth and assembled with a spacer of 50 μm interposed therebetween so that the respective rubbing directions are opposingly in parallel with each other, and nematic liquid crystal (ZLI-2293, manufactured by Merck Co.) was injected into the space to obtain a liquid crystal cell.

The alignment condition of the liquid crystal cell was observed by a polarization microscope, and confirmed to be uniform with no defect. Further, with respect to the cell, the tilt angle of liquid crystal was measured by a crystal rotation method and found to be 1.0°. Thus, the tilt angle was low.

Further, the liquid crystal cell was subjected to heat treatment in an oven at a temperature of 120° C. for one hour, and the alignment condition was observed by a polarization microscope, whereby an uniform alignment with no defect was confirmed. Further, with regard to the cell, the tilt angle of liquid crystal was measured by a crystal rotation method and found to be 1.0°. Thus, the tilt angle was low and stable.

EXAMPLE 9

24.2 g (0.1 mol) of 1,5-bis(4-aminophenoxy)pentane and 21.8 g (0.096 mol) of pyromellitic dianhydride were reacted in 260.6 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.94 dl/g (as measured in NMP at a temperature of 30° C. and at a concentration of 0.5 g/dl), was obtained with good reproducibility.

This solution was diluted with NMP to a total solid content of 4 wt %. Then, the solution was spin-coated at 4500 rpm on glass substrates and then subjected to heat treatment at 80° C. for 5 minutes and at 250° C. for one hour to form polyimide resin films having a thickness of 1000 Å.

The coating films were rubbed with a cloth and assembled with a spacer of 50 μm interposed therebetween so that the respective rubbing directions are opposingly in parallel with each other, and nematic liquid crystal (ZLI-2293, manufactured by Merck Co.) was injected into the space to obtain a liquid crystal cell.

The alignment condition of the liquid crystal cell was observed by a polarization microscope, and confirmed to be uniform with no defect. Further, with respect to the cell, the tilt angle of liquid crystal was measured by a crystal rotation method and found to be 0.9°. Thus, the tilt angle was low.

Further, the liquid crystal cell was subjected to heat treatment in an oven at a temperature of 120° C. for one hour, and the alignment condition was observed by a polarization microscope, whereby an uniform alignment with no defect was confirmed. Further, with regard to the cell, the tilt angle of liquid crystal was measured by a crystal rotation method and found to be 0.9°. Thus, the tilt angle was low and stable.

EXAMPLE 10

The same polyimide precursor (polyamic acid) solution as used in Example 1 was prepared. Namely, 22.8 g (0.1 mol) of 1,4-bis(4-aminophenoxy)butane and 19.2 g (0.098 mol) of 1,2,3,4-cyclobutane tetracarboxylic dianhydride were reacted in 343.5 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.9 dl/g (as measured in NMP at a temperature of 30° C. and at a concentration of 0.5 g/dl), was obtained.

This solution was diluted with NMP to a total solid content of 4 wt %, in the same manner as in Example 1. Then, the solution was spin-coated at 3500 rpm on glass substrates and then subjected to heat treatment at 80° C. for 5 minutes and at 250° C. for one hour to form polyimide resin films having a thickness of 1000 Å.

The coating films were rubbed with a cloth, and the substrates subjected to such a rubbing treatment, were assembled with a spacer of 2 μm interposed therebetween so that the respective rubbing directions are in parallel with each other, and ferroelectric smectic liquid crystal (CS-1014, manufactured by Chisso Co.) was injected into the space to obtain a surface-stabilized liquid crystal cell. The alignment condition of the cell was observed by a polarization microscope, and no defect was found at any region of the liquid crystal cell. Thus, an uniform alignment of ferroelectric liquid crystal was confirmed.

EXAMPLE 11

The same polyimide precursor (polyamic acid) solution as used in Example 2 was prepared. Namely, 24.2 g (0.1 mol) of 1,5-bis(4-aminophenoxy)pentane and 19.2 g (0.098 mol) of 1,2,3,4-cyclobutane tetracarboxylic dianhydride were reacted in 343.5 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.8 dl/g (as measured in NMP at a temperature of 30° C. and at a concentration of 0.5 g/dl), was obtained.

This solution was diluted with NMP to a total solid content of 4 wt %, in the same manner as in Example 2. Then, the solution was spin-coated at 3500 rpm on glass substrates and then subjected to heat treatment at 80° C. for 5 minutes and at 250° C. for one hour to form polyimide resin films having a thickness of 1000 Å.

The coating films were rubbed with a cloth, and the substrates subjected to such a rubbing treatment, were assembled with a spacer of 2 μm interposed therebetween so that the respective rubbing directions are in parallel with each other, and ferroelectric smectic liquid crystal (CS-1014, manufactured by Chisso Co.) was injected into the space to obtain a surface-stabilized liquid crystal cell. The alignment condition of the cell was observed by a polarization microscope, and no defect was found at any region of the liquid crystal cell. Thus, an uniform alignment of ferroelectric liquid crystal was confirmed.

EXAMPLE 12

The same polyimide precursor (polyamic acid) solution as used in Example 3 was prepared. Namely, 34.2 g (0.1 mol) of 1,9-bis(4-aminophenoxy)nonane and 19.2 g (0.098 mol) of 1,2,3,4-cyclobutane tetracarboxylic dianhydride were reacted in 302.6 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.75 dl/g (as measured in NMP at a temperature of 30° C. and at a concentration of 0.5 g/dl), was obtained.

This solution was diluted with NMP to a total solid content of 4 wt %, in the same manner as in Example 3. Then, the solution was spin-coated at 3000 rpm on glass substrates and then subjected to heat treatment at 80° C. for 5 minutes and at 250° C. for one hour to form polyimide resin films having a thickness of 1000 Å.

The coating films were rubbed with a cloth, and the substrates subjected to such a rubbing treatment, were assembled with a spacer of 2 μm interposed therebetween so that the respective rubbing directions are in parallel with each other, and ferroelectric smectic liquid crystal (CS-1014, manufactured by Chisso Co.) was injected into the space to obtain a surface-stabilized liquid crystal cell. The alignment condition of the cell was observed by a polarization microscope, and no defect was found at any region of the liquid crystal cell. Thus, an uniform alignment of ferroelectric liquid crystal was confirmed.

EXAMPLE 13

The same polyimide precursor (polyamic acid) solution as used in Example 7 was prepared. Namely, 22.8 g (0.1 mol) of 1,4-bis(4-aminophenoxy)butane and 21.8 g (0.096 mol) of pyromellitic dianhydride were reacted in 252.7 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.92 dl/g (as measured in NMP at a temperature of 30° C. and at a concentration of 0.5 g/dl), was obtained.

This solution was diluted with NMP to a total solid content of 4 wt %, in the same manner as in Example 7. Then, the solution was spin-coated at 4000 rpm on glass substrates and then subjected to heat treatment at 80° C. for 5 minutes and at 250° C. for one hour to form polyimide resin films having a thickness of 1000 Å.

The coating films were rubbed with a cloth, and the substrates subjected to such a rubbing treatment, were assembled with a spacer of 2 μm interposed therebetween so that the respective rubbing directions are in parallel with each other, and ferroelectric smectic liquid crystal (CS-1014, manufactured by Chisso Co.) was injected into the space to obtain a surface-stabilized liquid crystal cell. The alignment condition of the cell was observed by a polarization microscope, and no defect was found at any region of the liquid crystal cell. Thus, an uniform alignment of ferroelectric liquid crystal was confirmed.

EXAMPLE 14

The same polyimide precursor (polyamic acid) solution as used in Example 8 was prepared. Namely, 31.4 g (0.1 mol) of 1,7-bis(4-aminophenoxy)heptane and 19.2 g (0.098 mol) of 1,2,3,4-cyclobutane tetracarboxylic dianhydride were reacted in 286.7 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.76 dl/g (as measured in NMP at a temperature of 30° C. and at a concentration of 0.5 g/dl), was obtained with good reproducibility.

This solution was diluted with NMP to a total solid content of 4 wt %, in the same manner as in Example 8. Then, the solution was spin-coated at 3000 rpm on glass substrates and then subjected to heat treatment at 80° C. for 5 minutes and at 250° C. for one hour to form polyimide resin films having a thickness of 1000 Å.

The coating films were rubbed with a cloth, and the substrates subjected to such a rubbing treatment, were assembled with a spacer of 2 μm interposed therebetween so that the respective rubbing directions are in parallel with each other, and ferroelectric smectic liquid crystal (CS-1014, manufactured by Chisso Co.) was injected into the space to obtain a surface-stabilized liquid crystal cell. The alignment condition of the cell was observed by a polarization microscope, and no defect was found at any region of the liquid crystal cell. Thus, an uniform alignment of ferroelectric liquid crystal was confirmed.

EXAMPLE 15

The same polyimide precursor (polyamic acid) solution as used in Example 9 was prepared. Namely, 24.2 g (0.1 mol) of 1,5-bis(4-aminophenoxy)pentane and 21.8 g (0.096 mol) of pyromellitic dianhydride were reacted in 260.6 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.94 dl/g (as measured in NMP at a temperature of 30° C. and at a concentration of 0.5 g/dl), was obtained with good reproducibility.

This solution was diluted with NMP to a total solid content of 4 wt %, in the same manner as in Example 9. Then, the solution was spin-coated at 4500 rpm on glass substrates and then subjected to heat treatment at 80° C. for 5 minutes and at 250° C. for one hour to form polyimide resin films having a thickness of 1000 Å.

The coating films were rubbed with a cloth, and the substrates subjected to such a rubbing treatment, were assembled with a spacer of 2 μm interposed therebetween so that the respective rubbing directions are in parallel with each other, and ferroelectric smectic liquid crystal (CS-1014, manufactured by Chisso Co.) was injected into the space to obtain a surface-stabilized liquid crystal cell. The alignment condition of the cell was observed by a polarization microscope, and no defect was found at any region of the liquid crystal cell. Thus, an uniform alignment of ferroelectric liquid crystal was confirmed.

COMPARATIVE EXAMPLE 1

20.0 g (0.1 mol) of diaminodiphenyl ether and 19.2 g (0.098 mol) of 1,2,3,4-cyclobutane tetracarboxylic dianhydride were reacted in 343.5 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.98 dl/g (as measured in NMP at a temperature of 30° C. and at a concentration of 0.5 g/dl), was obtained.

This solution was diluted with NMP to a total solid content of 3 wt %. Then, the solution was spin-coated at 3000 rpm on glass substrates and then subjected to heat treatment at 80° C. for 5 minutes and at 250° C. for one hour to form polyimide resin films having a thickness of 1000 Å. The coating films were rubbed with a cloth and assembled with a spacer of 50 μm interposed therebetween so that the respective rubbing directions are opposingly in parallel with each other, and nematic liquid crystal (ZLI-2293, manufactured by Merck Co.) was injected into the space to obtain a liquid crystal cell.

The alignment condition of the liquid crystal cell was observed by a polarization microscope, and confirmed to be uniform with no defect. Further, with respect to the cell, the tilt angle of liquid crystal was measured by a crystal rotation method and found to be 3.6°.

Further, the liquid crystal cell was subjected to heat treatment in an oven at a temperature of 120° C. for one hour, and the alignment condition was observed by a polarization microscope, whereby an uniform alignment with no defect was found out. However, with regard to the cell, the tilt angle of liquid crystal was measured by a crystal rotation method and found to be 4.1°. Thus, the tilt angle became high by the heat treatment, and a low tilt angle could not be obtained after heat treatment.

COMPARATIVE EXAMPLE 2

22.6 g (0.1 mol) of 4,4'-diamino-3,3'-dimethyldicyclohexylmethane and 19.2 g (0.098 mol) of 1,2,3,4-cyclobutane tetracarboxylic dianhydride were reacted in 343.5 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.78 dl/g (as measured in NMP at a temperature of 30° C. and at a concentration of 0.5 g/dl), was obtained.

This solution was diluted with NMP to a total solid content of 4 wt %. Then, the solution was spin-coated at 3500 rpm on glass substrates and then subjected to heat treatment at 80° C. for 5 minutes and at 250° C. for one hour to form polyimide resin films having a thickness of 1000 Å.

The coating films were rubbed with a cloth and assembled with a spacer of 50 μm interposed therebetween so that the respective rubbing directions are opposingly in parallel with each other, and nematic liquid crystal (ZLI-2293, manufactured by Merck Co.) was injected into the space to obtain a liquid crystal cell.

The alignment condition of the liquid crystal cell was observed by a polarization microscope, and confirmed to be uniform with no defect. Further, with regard to the cell, the tilt angle of liquid crystal was measured by a crystal rotation method and found to be 3.8°.

Further, the liquid crystal cell was subjected to heat treatment in an oven at a temperature of 120° C. for one hour, and the alignment condition was observed by a polarization microscope, whereby an alignment condition with many defects was found out.

COMPARATIVE EXAMPLE 3

20.0 g (0.1 mol) of diaminodiphenyl ether and 19.2 g (0.098 mol) of 1,2,3,4-cyclobutane tetracarboxylic dianhydride were reacted in 343.5 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.98 dl/g (as measured in NMP at a temperature of 30° C. and at a concentration of 0.5 g/dl), was obtained.

This solution was diluted with NMP to a total solid content of 3 wt %. Then, the solution was spin-coated at 3000 rpm on glass substrates and then subjected to heat treatment at 80° C. for 5 minutes and at 250° C. for one hour to form polyimide resin films having a thickness of 1000 Å. The coating films were rubbed with a cloth, and the substrates subjected to such rubbing treatment were assembled with a spacer of 2 μm interposed therebetween so that the respective rubbing directions are in parallel with each other, and ferroelectric smectic liquid crystal (CS-1014, manufactured by Chisso Co.) was injected into the space to obtain a surface-stabilized liquid crystal cell. The alignment condition of the cell was observed by a polarization microscope, whereby many zigzag defects and linear defects were found, and t he alignment of ferroelectric liquid crystal was uniform.

COMPARATIVE EXAMPLE 4

22.6 g (0.1 mol) of 4,4'-diamino-3,3'-dimethyldicyclohexylmethane and 19.2 g (0.098 mol) of 1,2,3,4-cyclobutane tetracarboxylic dianhydride were reacted in 343.5 g of N-methylpyrrolidone (hereinafter referred to as NMP for short) for 10 hours at room temperature to prepare a polyimide precursor (polyamic acid) solution. The polymerization reaction proceeded easily and uniformly, and a polyimide precursor having a reduced viscosity of 0.78 dl/g (as measured in NMP at a temperature of 30° C. and at a concentration of 0.5 g/dl), was obtained.

This solution was diluted with NMP to a total solid content of 4 wt %. Then, the solution was spin-coated at 3500 rpm on glass substrates and then subjected to heat treatment at 80° C. for 5 minutes and at 250° C. for one hour to form polyimide resin films having a thickness of 1000 Å. The coating films were rubbed with a cloth, and the substrates subjected to such rubbing treatment were assembled with a spacer of 2 μm interposed therebetween so that the respective rubbing directions are in parallel with each other, and ferroelectric smectic liquid crystal (CS-1014, manufactured by Chisso Co.) was injected into the space to obtain a surface-stabilized liquid crystal cell. The alignment condition of the cell was observed by a polarization microscope, whereby many zigzag defects and linear defects were found, and the alignment of ferroelectric liquid crystal was uniform.

COMPARATIVE EXAMPLE 5

11.6 g (0.1 mol) of 1,6-diaminohexane and 19.2 g (0.098 mol) of 1,2,3,4-cyclobutane tetracarboxylic dianhydride were reacted in 174.5 g of N-methylpyrrolidone (hereinafter referred to as NMP for short) for 10 hours at room temperature, and it was tried to prepare a polyimide precursor (polyamic acid) solution. However, since a salt was formed due to high basicity of 1,6-diaminohexane, the polymerization reaction did not proceed uniformly. Further, even if the amount of acid anhydride charged was the same, a salt was formed due to high basicity of 1,6-diaminohexane, and the formation of the salt was not quantitative, whereby the viscosity of polyimide precursors obtained was different in each polymerization. As an example of polyimide precursors having different viscosity, a polyimide precursor having a reduced viscosity of 0.5 dl/g (as measured in NMP at a temperature of 30° C. and at a concentration of 0.5 g/dl), was obtained.

This solution was diluted with NMP to a total solid content of 6 wt %. Then, the solution was spin-coated at 3000 rpm on glass substrates and then subjected to heat treatment at 80° C. for 5 minutes and at 250° C. for one hour to form polyimide resin films having a thickness of 1000 Å.

The coating films were rubbed with a cloth and assembled with a spacer of 50 μm interposed therebetween so that the respective rubbing directions are opposingly in parallel with each other, and nematic liquid crystal (ZLI-2293, manufactured by Merck Co.) was injected into the space to obtain a liquid crystal cell.

The alignment condition of the liquid crystal cell was observed by a polarization microscope, and confirmed to be uniform with no defect. Further, with regard to the cell, the tilt angle of liquid crystal was measured by a crystal rotation method and found to be 1.9°.

Further, the liquid crystal cell was subjected to heat treatment in an oven at a temperature of 120° C. for one hour, and the alignment condition was observed by a polarization microscope, whereby an uniform alignment with no defect was found out. However, with regard to the cell, the tilt angle of liquid crystal was measured by a crystal rotation method and found to be 2.5°. Thus, the tilt angle became high by the heat treatment, and a low tilt angle could not be obtained after heat treatment.

COMPARATIVE EXAMPLE 6

11.6 g (0.1 mol) of 1,6-diaminohexane and 19.2 g (0.098 mol) of 1,2,3,4-cyclobutane tetracarboxylic dianhydride were reacted in 174.5 g of N-methylpyrrolidone (hereinafter referred to as NMP for short) for 10 hours at room temperature, and it was tried to prepare a polyimide precursor (polyamic acid) solution. However, since a salt was formed due to high basicity of 1,6-diaminohexane, the polymerization reaction did not proceed uniformly. Further, even if the amount of acid anhydride charged was the same, a salt was formed due to high basicity of 1,6-diaminohexane, and the formation of the salt was not quantitative, the viscosity of polyimide precursors obtained was different in each polymerization. As an example of polyimide precursors having different viscosity, a polyimide precursor having a reduced viscosity of 0.5 dl/g (as measured in NMP at a temperature of 30° C. and at a concentration of 0.5 g/dl), was obtained.

This solution was diluted with NMP to a total solid content of 6 wt %. Then, the solution was spin-coated at 3000 rpm on glass substrates and then subjected to heat treatment at 80° C. for 5 minutes and at 250° C. for one hour to form polyimide resin films having a thickness of 1000 Å. Then, the coating films were rubbed with a cloth, and a pair of substrates subjected to such rubbing treatment, were assembled with a spacer of 2 μm interposed therebetween so that the respective rubbing directions are in parallel with each other, and ferroelectric smectic liquid crystal (CS-1014, manufactured by Chisso Co.) was injected into the space to obtain a surface-stabilized liquid crystal cell. The alignment condition of the cell was observed by a polarization microscope, and no defects was found at any region of the liquid crystal cell, whereby an uniform alignment of ferroelectric liquid crystal was confirmed. However, although the alignment of ferroelectric liquid crystal was good, a salt was formed since 1,6-diaminohexane is highly basic. Further, since the formation of the salt was not quantitative, the viscosity of polyimide precursors obtained was different in each polymerization. Therefore, it was difficult to prepare a polyimide precursor which was highly reproducible.

INDUSTRIAL APPLICABILITY

By the treating agent for liquid crystal alignment of the present invention, it is possible to obtain a liquid crystal alignment film having a low tilt angle and being thermally stable, and to obtain a liquid crystal device having higher contrast as compared with conventional one. Further, by using the treating agent for liquid crystal alignment of the present invention, a ferroelectric liquid crystal display device and an antiferroelectric liquid crystal display device exhibit excellent properties.

What is claimed is:

1. An alignment treating agent for a liquid crystal cell, which is composed mainly of a polyimide, a polyimide precursor or a mixture thereof, wherein said polyimide or precursor thereof is made by a polymerization reaction of a tetracarboxylic acid derivative component with a diamine component, wherein at least one part of the diamine component is a diamine component of the following formula (1):

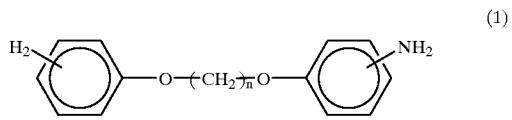

wherein n is an integer of from 1 to 12, and which gives a tilt angle of at most 2° to nematic liquid crystal.

2. The alignment treating agent for a liquid crystal cell according to claim 1, wherein the diamine of the formula (1) in the diamine component is at least 50 mol % to the total diamine component.

3. The alignment treating agent for a liquid crystal cell according to claim 1, wherein the tetracarboxylic acid derivative component is at least one tetracarboxylic acid derivative selected from the group consisting of an aromatic tetracarboxylic acid derivative and a cyclobutane tetracarboxylic acid derivative.

4. The alignment treating agent for a liquid crystal cell according to claim 1, wherein in the diamine compound of formula (1) n is an integer of 3 to 12.

5. The alignment treating agent for a liquid crystal cell according to claim 1, wherein the diamine component consists essentially of the diamine component of formula (1).

* * * * *